US011281786B2

(12) United States Patent
Dambal et al.

(10) Patent No.: US 11,281,786 B2
(45) Date of Patent: Mar. 22, 2022

(54) MECHANISM TO SECURE SIDE BAND COMMUNICATION BETWEEN SERVICE PROCESSOR AND AN END POINT

(71) Applicant: DELL PRODUCTS, LP, Round Rock, TX (US)

(72) Inventors: Sanjeev Dambal, Austin, TX (US); Chandrashekar Nelogal, Round Rock, TX (US); Marshal Savage, Austin, TX (US); Choudary Maddukuri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 470 days.

(21) Appl. No.: 16/431,944

(22) Filed: Jun. 5, 2019

(65) Prior Publication Data
US 2020/0389315 A1  Dec. 10, 2020

(51) Int. Cl.
| | |
|---|---|
| *G06F 21/60* | (2013.01) |
| *H04L 9/32* | (2006.01) |
| *H04L 29/06* | (2006.01) |
| *G06F 13/16* | (2006.01) |
| *G06F 13/42* | (2006.01) |
| *H04L 9/08* | (2006.01) |

(52) U.S. Cl.
CPC ........ *G06F 21/606* (2013.01); *G06F 13/1668* (2013.01); *G06F 13/4282* (2013.01); *H04L 9/083* (2013.01); *H04L 9/3215* (2013.01); *H04L 9/3236* (2013.01); *H04L 63/0428* (2013.01); *H04L 63/166* (2013.01); *G06F 2213/0016* (2013.01)

(58) Field of Classification Search
CPC ..................................................... G06F 21/606
See application file for complete search history.

(56) References Cited

U.S. PATENT DOCUMENTS

| | | | |
|---|---|---|---|
| 8,738,915 B2 | 5/2014 | Jaber et al. | |
| 8,996,751 B2 | 3/2015 | Pereira et al. | |
| 11,080,675 B1* | 8/2021 | Guise | ................... G06Q 20/206 |
| 2006/0270449 A1* | 11/2006 | Kim | ....................... H04H 40/18 |
| | | | 455/552.1 |
| 2014/0298411 A1* | 10/2014 | Castell | .................. H04W 12/08 |
| | | | 726/2 |
| 2018/0060077 A1* | 3/2018 | Abdulhamid | ........... G06F 21/57 |
| 2018/0341773 A1 | 11/2018 | Khatri et al. | |

\* cited by examiner

*Primary Examiner* — Bradley W Holder
(74) *Attorney, Agent, or Firm* — Larson Newman, LLP

(57) ABSTRACT

An information handling system includes an endpoint device and a service processor. The endpoint device is configured to share a passphrase with the service processor via shared memory architecture transfer mechanism. The service processor is configured generate the sent hash of a message; encrypt the message, the sent hash, and the nonce value using the passphrase to form an encrypted message; and transmit the encrypted message to the endpoint device over a sideband interface. The storage controller is further configured to decrypt the encrypted message using the passphrase to obtain the message, the sent hash, and the nonce value; compare the nonce value to a counter to determine if the nonce value is an old nonce value; calculate an observed hash of the message; and accept the message when the nonce value is not an old nonce value and the observed hash matches the received hash.

17 Claims, 6 Drawing Sheets

MECHANISM TO SECURE SIDE BAND COMMUNICATION BETWEEN SERVICE PROCESSOR AND AN END POINT

FIELD OF THE DISCLOSURE

The present disclosure generally relates to information handling systems, and more particularly relates to securing side band communication between a service processor and an end point.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system can include an endpoint device and a service processor. The endpoint device can be configured to share a passphrase with the service processor via shared memory architecture transfer mechanism. The service processor can be configured generate the sent hash of a message; encrypt the message, the sent hash, and a nonce value using the passphrase to form an encrypted message; and transmit the encrypted message to the endpoint device over a sideband interface. The storage controller can be further configured to decrypt the encrypted message using the passphrase to obtain the message, the sent hash, and the nonce value; compare the nonce value to a counter to determine if the nonce value is an old nonce value; calculate an observed hash of the message; and accept the message when the nonce value is not an old nonce value and the observed hash matches the received hash.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols indifferent drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
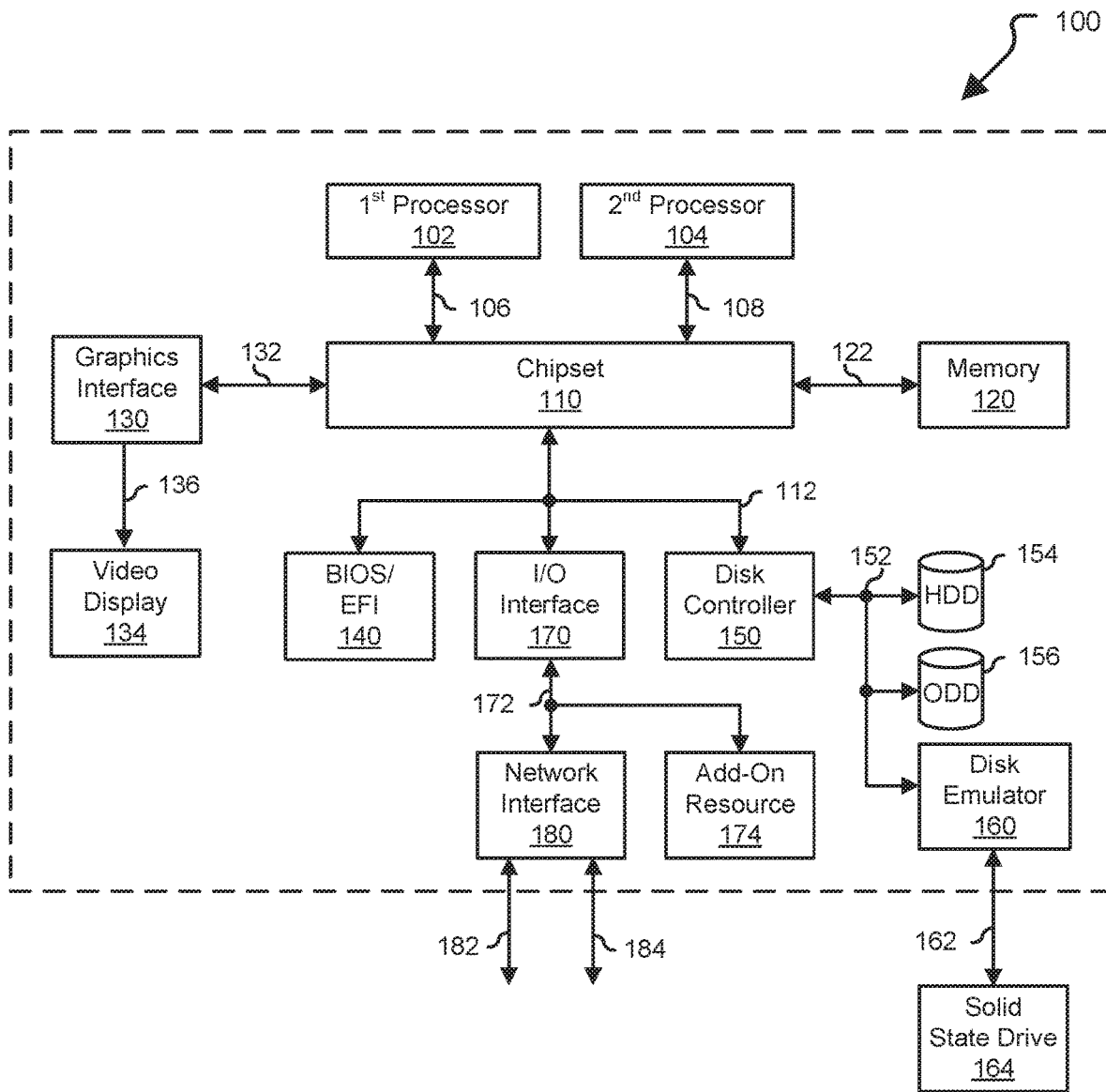
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
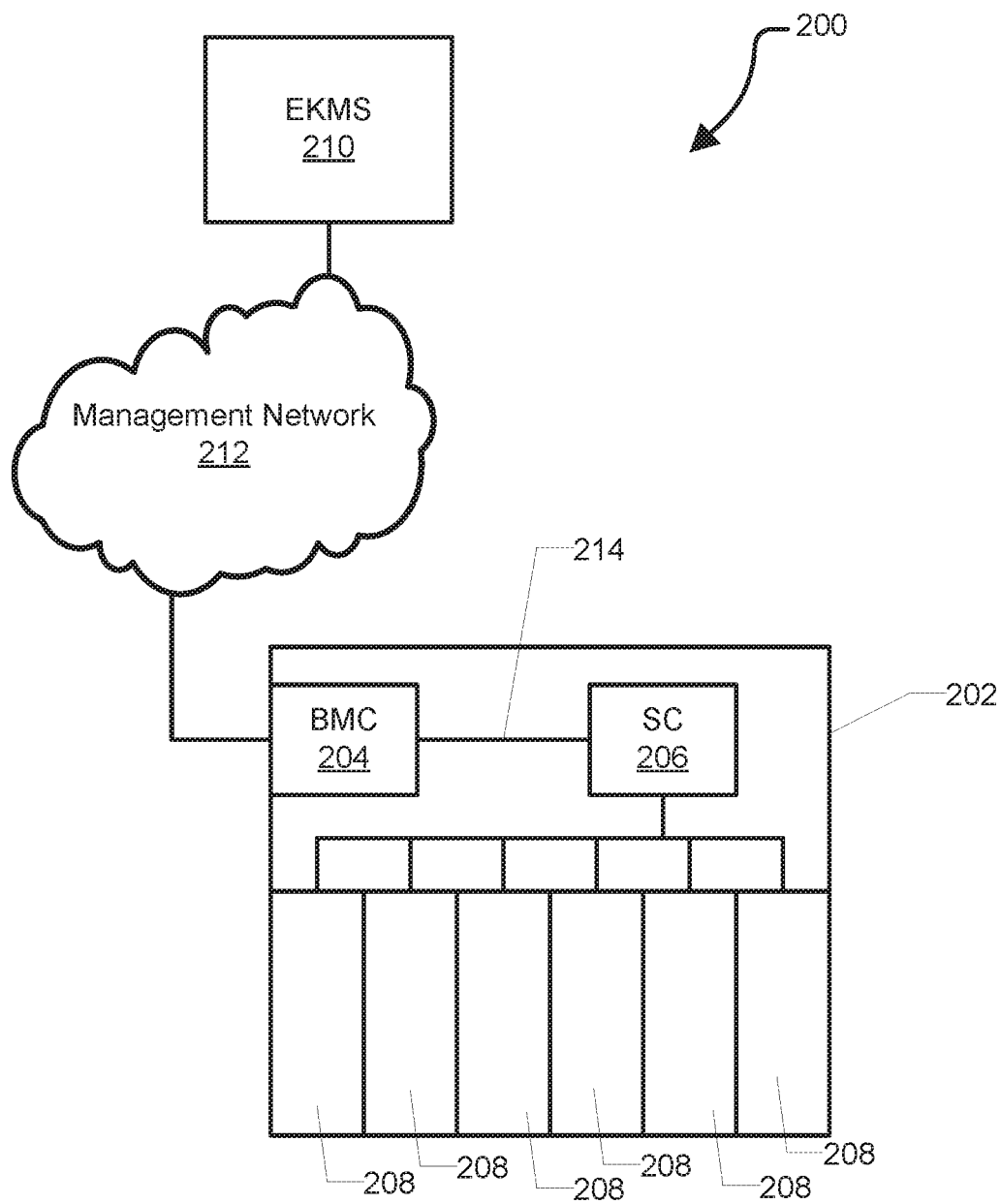
FIG. 2 is a schematic diagram illustrating an exemplary data storage system according to an embodiment of the present disclosure.

FIG. 2 shows an exemplary data storage system 200 that can include a network attached storage 202. The network attached storage 202 can include a baseboard management controller 204 and a storage controller 206. Additionally, the network attached storage 202 can include storage devices 208. In various embodiments, the storage devices 208 can be self-encrypting drives. Self-encrypting drives provide hardware-based encryption of the data stored on the self-encrypting drive. Access to the data can be dependent on access to an encryption key. In a large network, key management can be centralized using an enterprise key management server 210. Enterprise key management server 210 can manage keys for various devices including self-encrypting drives, such as self-encrypting drives located throughout a data center.

In various embodiments, enterprise key management server 210 can communicate with baseboard management controller 204 through a network 212. Additionally, baseboard management controller 204 can communicate with the storage controller 206 through a sideband interface 214, such as an I2C interface. In various embodiments, communication between the baseboard management controller 204 and storage controller 206 can utilize management component transport protocol (MCTP) over the sideband interface 214. As such, the communication may be unencrypted and unauthenticated. As sideband interface 214 is in the data path between the enterprise key management server 210 and the storage controller 206, it can be desirable to provide encryption and authentication to protect the integrity of the data stored by storage devices 208. Encrypting the transmission of storage keys between the baseboard management controller 204 and the storage controller 206 can reduce the likelihood that a compromised device or component attached to sideband interface 214 can be used to capture the encryption keys. Additionally, providing an authentication mechanism can prevent a compromised device or component attached to sideband interface 214 from accessing or corrupting the data.

Figure 3:
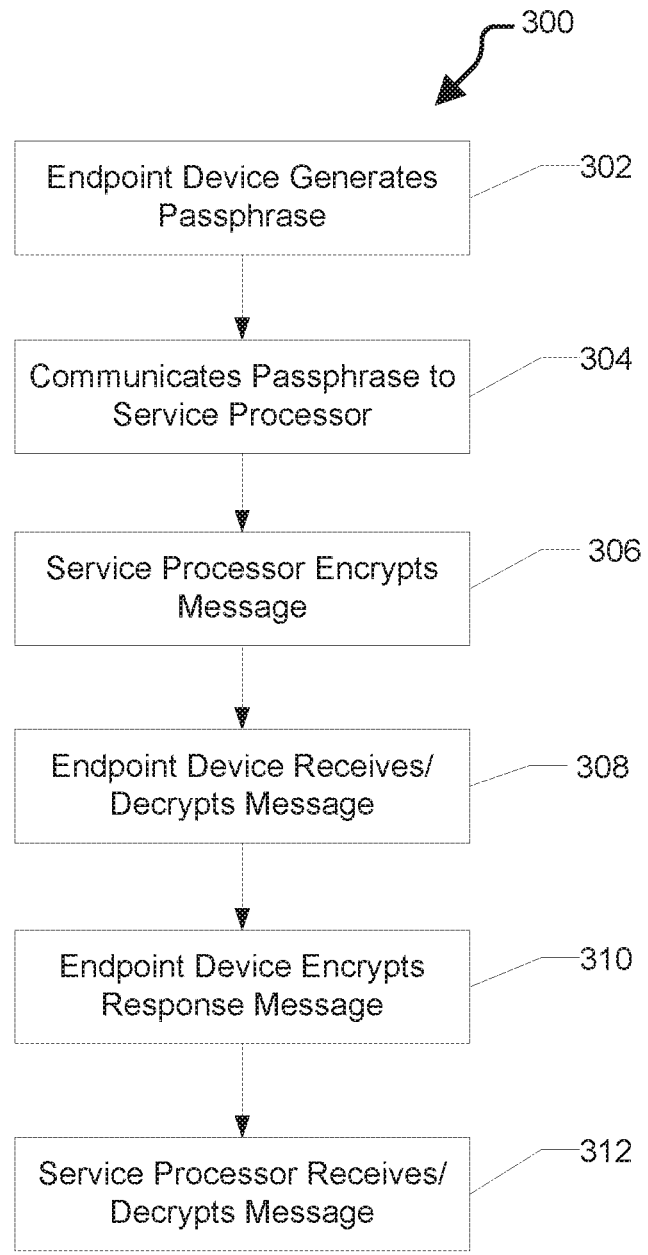
FIG. 3 is a flow diagram illustrating an exemplary method of establishing an encrypted connection using a symmetric key encryption scheme according to an embodiment of the present disclosure.

FIG. 3 illustrates an exemplary method 300 of establishing encrypted and authenticated communication between devices communicating on a sideband interface. At 302, an endpoint device, such as a storage controller, can generate a passphrase. In various embodiments, a BIOS can load a UEFI driver for the endpoint device. The UEFI driver can request the endpoint device generates the passphrase.

At 304, the passphrase can be provided to a service processor, such as a baseboard management controller. The passphrase can be provided to the service processor on an interface other than the sideband interface. In various embodiments, the passphrase can be provided using a shared memory architecture transfer mechanism. Additionally, the service processor and the endpoint device can agree on the encryption algorithm. In various embodiments, this can require negotiation over the sideband interface to identify the strongest level of encryption common to both the service processor and the endpoint device.

At 306, the service processor can use the passphrase to encrypt a message for the endpoint device, and, at 308, the encrypted message can be sent to the endpoint device. The endpoint device can decrypt the encrypted message using the passphrase. For example, a message containing EMKS keys can be encrypted by the baseboard management controller and sent to the storage controller. At 310, the endpoint device can use the passphrase to encrypt a response message to the service process, at 312, the endpoint device can send the encrypted message to the service processor. The service processor can decrypt the response message using the passphrase.

In various embodiments, once encrypted communication is established, a second passphrase can be generated by the endpoint device and sent by encrypted message to the service processor. In this way, new passphrases can be generated periodically. Changing the passphrase periodically can limit the amount of data sent using a single passphrase and reduce the likelihood that the current passphrase can be obtained by breaking the encryption. Messages encrypted using an old passphrase can be rejected as coming from an unauthorized source.

In various embodiments, a nonce value such as a counter can be added to each message. The counter can be incremented for each message such that a value of the counter may be used in only one message. The counter can be checked for each message and messages with old counter values can be discarded as coming from an unauthorized source.

In various embodiments, generation of a new passphrase can be triggered by the counter reaching a threshold value. This can provide a limit to the amount of data sent using a single passphrase. Alternatively, generation of a new passphrase can be triggered based on time.

In various embodiments, the service processor can store the passphrase and current counter value in a persistent memory such that the existing passphrase and current counter value can be retrieved in the event that the service processor is rebooted. This can allow communication between the service processor and the endpoint to be reestablished after rebooting the service processor. Rebooting the endpoint device can trigger the generation of a new passphrase and the reestablishment of communication following method 300. In this way, communication can be reestablished when the service processor is rebooted, the endpoint device is rebooted, or both the service processor and the endpoint device are rebooted.

Figure 4:
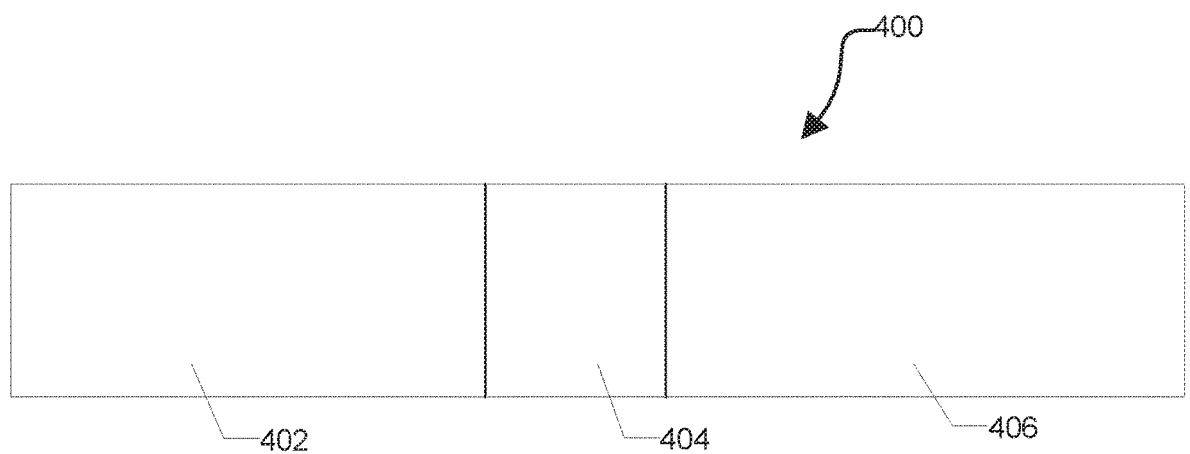
FIG. 4 is a block diagram illustrating an exemplary data format according to an embodiment of the present disclosure.

FIG. 4 illustrates an exemplary data packet 400 for encrypted and authenticated communication over a sideband interface. The data packet 400 can include the message 402, a counter 404, and a hash 406. Additionally, the entire data format can be encrypted for transmission.

Figure 5:
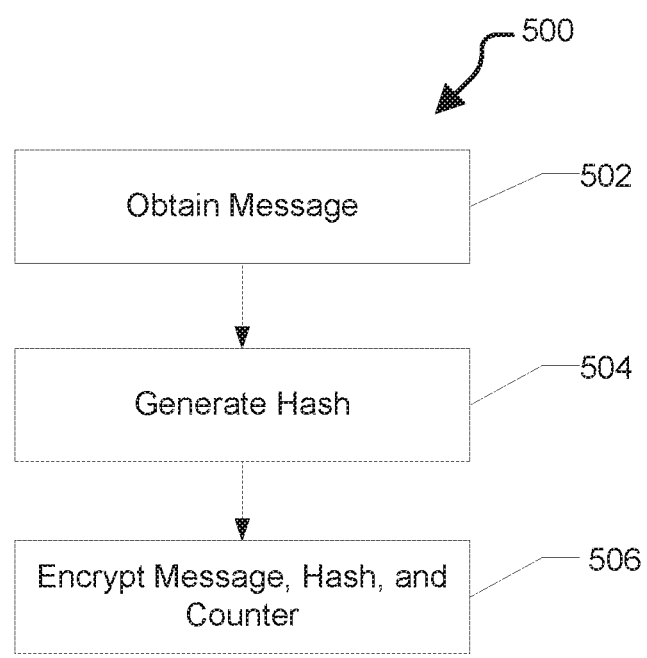
FIG. 5 is a flow diagram illustrating an exemplary method of encrypting a message using a symmetric key encryption scheme according to an embodiment of the present disclosure.

FIG. 5 illustrates an exemplary method 500 of encrypting a message. At 502, the message is obtained. At 504, a hash of the message is generated. At 506, the message, hash, and current counter value are encrypted using the passphrase to form the encrypted message.

Figure 6:
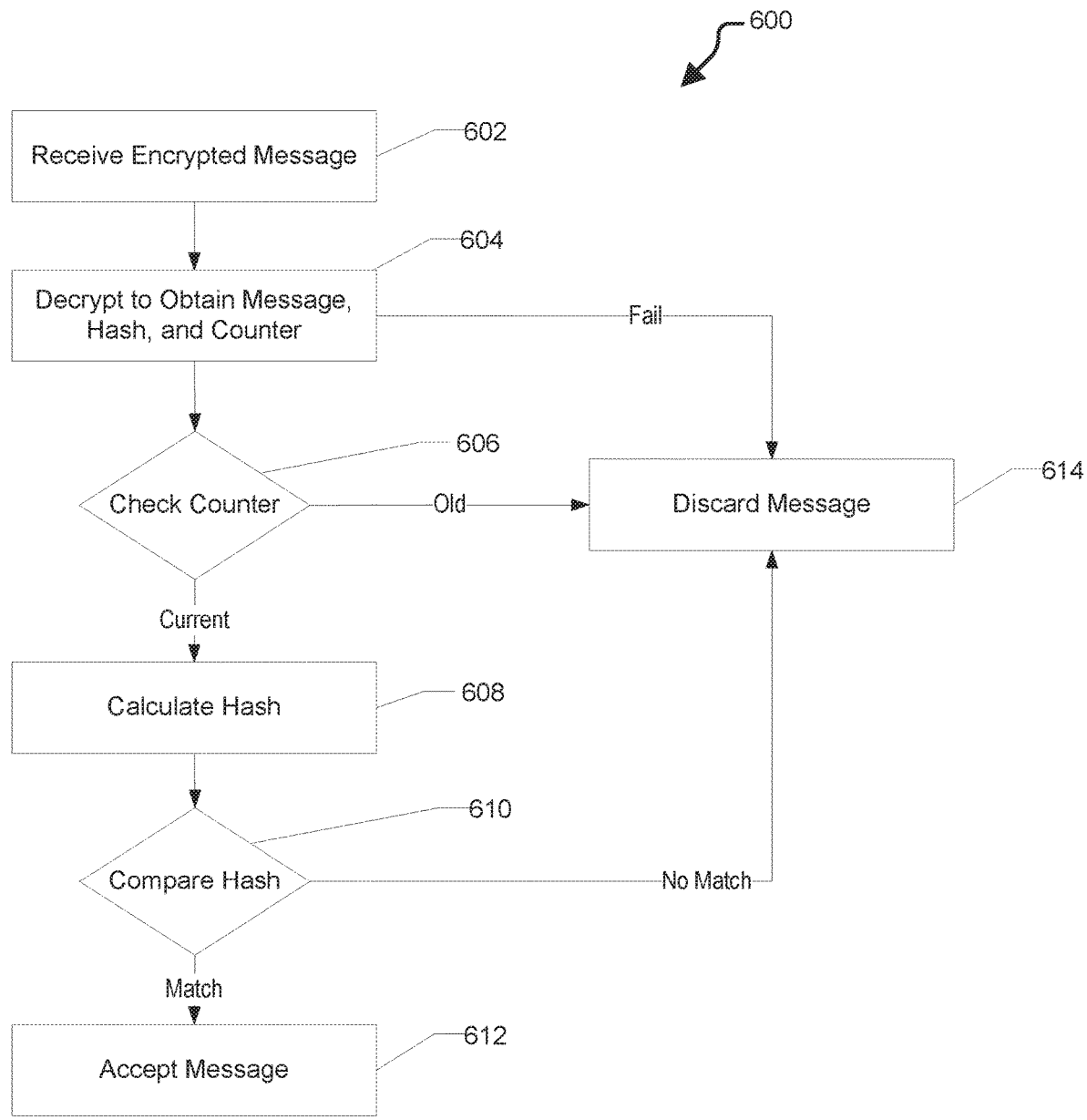
FIG. 6 is a flow diagram illustrating an exemplary method of decrypting and verifying the authenticity of a message according to an embodiment of the present disclosure.

FIG. 6 illustrates an exemplary method 600 of decrypting and verifying a message. At 602, an encrypted message is received. At 604, the encrypted message is decrypted using the passphrase to obtain a message, a hash of the message, and a counter. In the event that the passphrase used to encrypt the message and the passphrase used to decrypt the message do not match, decryption will fail, such as by producing a nonsense result. In the case of failed decryption, the message can be discarded as coming from an unauthorized source at 614 because it was encrypted using an old passphrase.

At 606, the counter can be checked. If the counter is an old value, the message can be discarded as coming from an unauthorized source at 614 because it was encrypted using an old passphrase. At 608, a hash of the message can be calculated, and at 610, the calculated hash can be compared to the received hash.

In the event that the calculated hash does not match the received has, the message can be discarded as coming from an unauthorized source at 614 because the message has been tampered with. At 612, the message can be accepted. In various embodiment, the message can contain a key to access a self-encrypting storage device.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
 a self-encrypting storage device configured to store data in an encrypted state; and
 a storage controller configured to:
 manage the self-encrypting storage device;
 generate a passphrase;
 share the passphrase with a baseboard management controller via a shared memory architecture transfer mechanism;
 receive an encrypted message from the baseboard management controller;
 decrypt the encrypted message using the passphrase to obtain a message, a sent hash, and a nonce value, the message including an encryption key to access the self-encrypting storage device;
 compare the nonce value to a counter to determine if the nonce value is an old nonce value;
 calculate an observed hash of the message;
 compare the observed hash with the sent hash; and
 accept the message when the nonce value is not an old nonce value and the observed hash matches the received hash;
 the baseboard management controller in communication with the storage controller using a sideband interface and configured to:

receive the passphrase from the storage controller via shared memory architecture transfer mechanism;

generate the sent hash of the message;

encrypt the message, the sent hash, and the nonce value using the passphrase to form the encrypted message; and transmit the encrypted message to the storage controller over the sideband interface.

2. The information handling system of claim 1, wherein the communication over the sideband interface is an inter-integrated circuit interface.

3. The information handling system of claim 1, wherein the communication over the sideband interface utilizes a management component transport protocol.

4. The information handling system of claim 1, wherein the baseboard management controller is further configured to communicate with an enterprise key management server over a management network.

5. The information handling system of claim 1, wherein the baseboard management controller is further configured to store the passphrase and a current counter value in a persistent memory location and reestablish communication using the passphrase and current counter after a reboot.

6. The information handling system of claim 1, wherein the storage controller is configured to generate a new passphrase and send the new passphrase to the baseboard management controller via encrypted message.

7. A method of encrypting communication, comprising:
managing a self-encrypting storage device;
generating a passphrase;
sharing the passphrase with a service processor via a shared memory architecture transfer mechanism;
receiving an encrypted message from the service processor over a sideband interface;
decrypting the encrypted message using the passphrase to obtain a message, a received hash, and a nonce value, the message including an encryption key to access a self-encrypting storage device;
comparing the nonce value to a counter to determine if the nonce value is an old nonce value;
calculating an observed hash of the message;
comparing the observed hash with the received hash; and
accepting the message when the nonce value is not an old nonce value and the observed hash matches the received hash.

8. The method of claim 7; further comprising rejecting the message when the nonce value is an old nonce value or when the hash does not match the calculated hash.

9. The method of claim 7; further comprising generating a hash of a message; encrypting the message, the hash, and nonce value using the passphrase to form an encrypted message; and transmitting the encrypted message to the endpoint device over the sideband interface.

10. The method of claim 7; wherein the message includes a key, and further comprising accessing a self-encrypting storage device using the key.

11. The method of claim 7; wherein the sideband interface is an I2C interface.

12. The method of claim 7; wherein the communication over the sideband interface utilizes a management component transport protocol.

13. A method of encrypting communication, comprising:
receiving a passphrase from an endpoint device via shared memory architecture transfer mechanism;
generating a hash of a message;
encrypting the message, the hash, and a nonce value using the passphrase to form an encrypted message; and
transmitting the encrypted message to the endpoint device over a sideband interface;
receiving an encrypted message from the endpoint device over the sideband interface;
decrypting the encrypted message using the passphrase to obtain a message, a received hash, and a nonce value;
comparing the nonce value to a counter to determine if the nonce value is an old nonce value;
calculating an observed hash of the message;
comparing the observed hash with the received hash;
accepting the message when the nonce value is not an old nonce value and the observed hash matches the received hash; and
storing the passphrase and a current counter value in a persistent memory location and reestablishing communication using the passphrase and current counter after a reboot.

14. The method of claim 13; further comprising rejecting the message when the nonce value is an old nonce value or when the hash does not match the calculated hash.

15. The method of claim 13, further comprising receiving a key from an enterprise key management server, wherein the message includes the key.

16. The method of claim 13; wherein the sideband interface is an inter-integrated circuit interface.

17. The method of claim 13; wherein the communication over the sideband interface utilizes a management component transport protocol.

* * * * *